United States Patent
Fair et al.

(10) Patent No.: US 7,752,395 B1
(45) Date of Patent: Jul. 6, 2010

(54) INTELLIGENT CACHING OF DATA IN A STORAGE SERVER VICTIM CACHE

(75) Inventors: Robert L. Fair, Cary, NC (US); Naveen Bali, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 407 days.

(21) Appl. No.: 11/713,061

(22) Filed: Feb. 28, 2007

(51) Int. Cl.
*G06F 12/08* (2006.01)
(52) U.S. Cl. ....................... 711/133; 711/135
(58) Field of Classification Search ................. 711/129, 711/137, 133, 135
See application file for complete search history.

(56) References Cited

U.S. PATENT DOCUMENTS

| | | | | |
|---|---|---|---|---|
| 5,606,685 A | * | 2/1997 | Frandeen | 711/136 |
| 5,829,038 A | * | 10/1998 | Merrell et al. | 711/143 |
| 6,434,669 B1 | * | 8/2002 | Arimilli et al. | 711/128 |
| 7,076,609 B2 | * | 7/2006 | Garg et al. | 711/133 |
| 7,155,572 B2 | * | 12/2006 | Hughes et al. | 711/122 |
| 7,502,889 B2 | * | 3/2009 | Sistla | 711/133 |
| 2004/0059875 A1 | * | 3/2004 | Garg et al. | 711/136 |
| 2006/0143396 A1 | * | 6/2006 | Cabot | 711/134 |
| 2007/0094450 A1 | | 4/2007 | VanderWiel | |

OTHER PUBLICATIONS

"The effect of using state-based priority information in a shared-memory multiprocessor cache replacement policy". Mounes-Toussi and Lilja. Proceedings: 1998 International Conference on Parallel Processing. Aug. 10-14, 1998.*

* cited by examiner

*Primary Examiner*—Pierre-Michel Bataille
(74) *Attorney, Agent, or Firm*—Blakely, Sokoloff, Taylor & Zafman LLP

(57) ABSTRACT

A network storage server has a non-volatile mass storage facility, a main cache and a victim cache. A technique of intelligently determining whether to cache a data block in the victim cache includes determining whether to store the data block in the victim cache based on a first caching policy and the type of data contained within the data block. The first caching policy may be a global policy. The determination of whether to store the data block in the victim cache further may be based on a second caching policy, which may be a volume-specific control of service (CoS) policy.

25 Claims, 7 Drawing Sheets

INTELLIGENT CACHING OF DATA IN A STORAGE SERVER VICTIM CACHE

FIELD OF THE INVENTION

At least one embodiment of the present invention pertains to network storage systems, and more particularly, to intelligent caching of data in a storage server victim cache.

BACKGROUND

Various forms of network storage systems exist today, including network attached storage (NAS), storage area networks (SANs), and others. Network storage systems are commonly used for a variety of purposes, such as backing up critical data, data mirroring, providing multiple users with access to shared data, etc.

A network storage system includes at least one storage server, which is a processing system configured to store and retrieve data on behalf of one or more client processing systems ("clients") that are used by users of the network storage system. In the context of NAS, a storage server is commonly a file server, which is sometimes called a "filer". A filer operates on behalf of one or more clients to store and manage shared files. The files are stored in a non-volatile mass storage subsystem (which is typically external to the storage server, but does not have to be) which may include one or more arrays of non-volatile mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with access to stored data at a sub-file level of granularity, such as block-level access, rather than file-level access. Some storage servers are capable of providing clients with both file-level access and block-level access, such as certain Filers made by Network Appliance, Inc. (NetApp®) of Sunnyvale, Calif.

Caching is a technique that is commonly used to reduce latency associated with accessing data in computer-related applications, including in network storage systems. For example, the main memory (i.e., random access memory (RAM)) of a storage server is often used as a cache logically between the storage server's main central processing unit (CPU) and the non-volatile mass storage (e.g., disk) subsystem, since the RAM which forms the main memory generally has a much smaller access latency than the disk subsystem. Accordingly, the main memory of a storage server is sometimes called the "buffer cache" or, simply, the "cache". Note that this kind of cache should not be confused with other forms of cache memory known as level-1 ("L1") cache, level-2 ("L2") cache, etc., which are commonly used by a microprocessor (and typically implemented on the same chip or the same motherboard as the microprocessor) to reduce the number of accesses to main memory. In the context of this document, the buffer cache (or simply "cache") of a storage server is the main memory of the storage server.

Some network storage servers also employ an additional level of caching logically between the buffer cache (main memory) and the non-volatile mass storage subsystem; this additional cache is known as a "victim cache". In the context of this document, a "victim cache" is a cache that holds some of the data blocks ("victims") most recently evicted from a main or primary cache, i.e., from the main memory of the storage server. The main memory in a storage server (or at least a portion of the main memory) is in certain instances called the "main cache" in this document, to distinguish it from the victim cache.

A victim cache in a storage server is generally a medium-size auxiliary storage facility that is faster than normal RAID disk storage, but slower than main memory. Such a victim cache might be implemented on, for example, an external memory card, using solid state disks (SSDs) or other types of storage devices. The size of such a cache can range from, for example, a few GBytes up to hundreds of GBytes or more. When a data block, or "buffer", is needed but not found in main memory, the victim cache is consulted prior to loading the buffer from RAID disks. Note that the terms "buffer" and "block" (or "data block") are used herein interchangeably.

Certain data blocks handled by a storage server are very important, such that it is desirable to be able to access those blocks quickly even after they have been evicted from the main cache; an example is blocks that contain system metadata. Other blocks may be less important and need not be as readily accessible after eviction from the main cache. Currently, there is no known ability to intelligently determine which blocks should or should not be stored in the victim cache upon eviction from the main cache, based on the type of data they contain. As a result, the failure to cache some important blocks combined with the unnecessary caching of less important blocks tends to degrade the overall performance of the storage server. In addition, there is a need to be able to customize victim caching for application-specific workloads.

SUMMARY OF THE INVENTION

The present invention includes a method of operating a network storage server, which includes performing data access operations on a non-volatile mass storage facility, a main cache and a victim cache of the network storage server, and, in response to a data block being designated for eviction from the main cache, determining whether to store the data block in the victim cache based on a caching policy and the type of data contained within the data block. The invention further includes an apparatus capable of performing such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for intelligently determining whether to cache data blocks in a victim cache of a storage server are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

As described in greater detail below, according to the technique introduced here, "intelligent" determinations of whether to cache data blocks in a victim cache of a network storage server are made by applying one or more caching policies. In certain embodiments, when a data block is evicted from the main cache of the storage server, a determination of whether to cache the data block in the victim cache is made based at least on a global caching policy, i.e., a caching policy which applies to all data volumes maintained by the storage server, or at least all data volumes within some defined storage domain. The determination further may be based on a volume-specific control of service (CoS) policy.

Note that the terms "main cache" and "victim cache" as used in this document do not refer to, and should not be confused with, other forms of cache memory known as level-1 ("L1") cache, level-2 ("L2") cache, etc., which are commonly used by a microprocessor (and typically implemented on the same chip or the same motherboard as the microprocessor) to reduce the number of accesses to main memory.

The approach introduced here allows customizable victim cache policies that enable a victim cache to be configured for the best possible performance, based on individual system requirements and application-specific workloads. Integration with CoS cache policies provide an integrated model that users can control to best effect. The net result is faster performance than a system without intelligent victim cache policies.

Note that a "volume", as the term is used herein, is a logical data set which is an abstraction of physical storage, combining one or more physical mass storage devices (e.g., disks) or parts thereof into a single logical storage object, and which is managed as a single administrative unit, such as a single file system. A volume may be defined from a larger group of available storage, such as an aggregate, and may be logically broken down into smaller logical data sets, such as one or more RAID groups.

Figure 1:
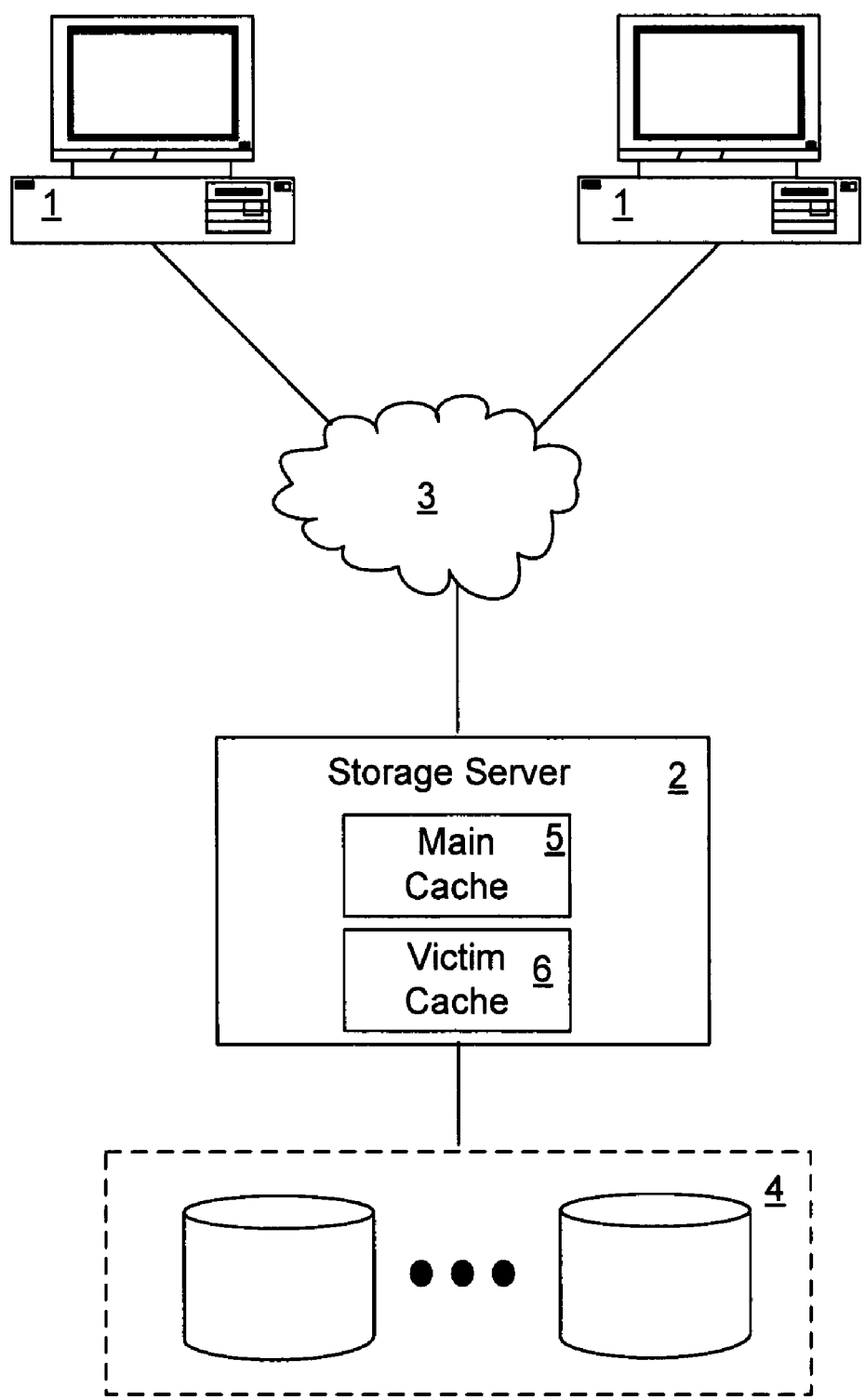
FIG. 1 illustrates a storage network environment which includes a storage server.

FIG. 1 shows a simple example of a network environment which incorporates a storage server 2, in which the technique introduced here can be implemented. As shown, the storage server 2 includes a main cache 5 and a victim cache 6. The storage server 2 is coupled to a mass storage subsystem 4, which includes a set of non-volatile mass storage devices and which is the largest data storage facility managed by the storage server 2. The storage server 2 is also coupled to a set of storage clients 1 (hereinafter simply "clients") through a network 3. The network 3 may be, for example, a local area network (LAN), a wide area network (WAN), a global area network (GAN) such as the Internet, a Fibre Channel fabric, or a combination of such networks. Each of the clients 1 may be, for example, a conventional personal computer (PC), server-class computer, workstation, or the like.

The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in storage subsystem 4 may be organized by the storage server 2 in the form of one or more RAID groups.

Although illustrated as a self-contained element, the storage server 2 may have a distributed architecture; for example, it may include a separate N- ("network") module and D- (disk) module (not shown). In such an embodiment, the N-module is used to communicate with clients 1, while the D-module includes the file system functionality and is used to communicate with the storage subsystem 4. The N- module and D- module communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the storage servers has access.

Figure 2:
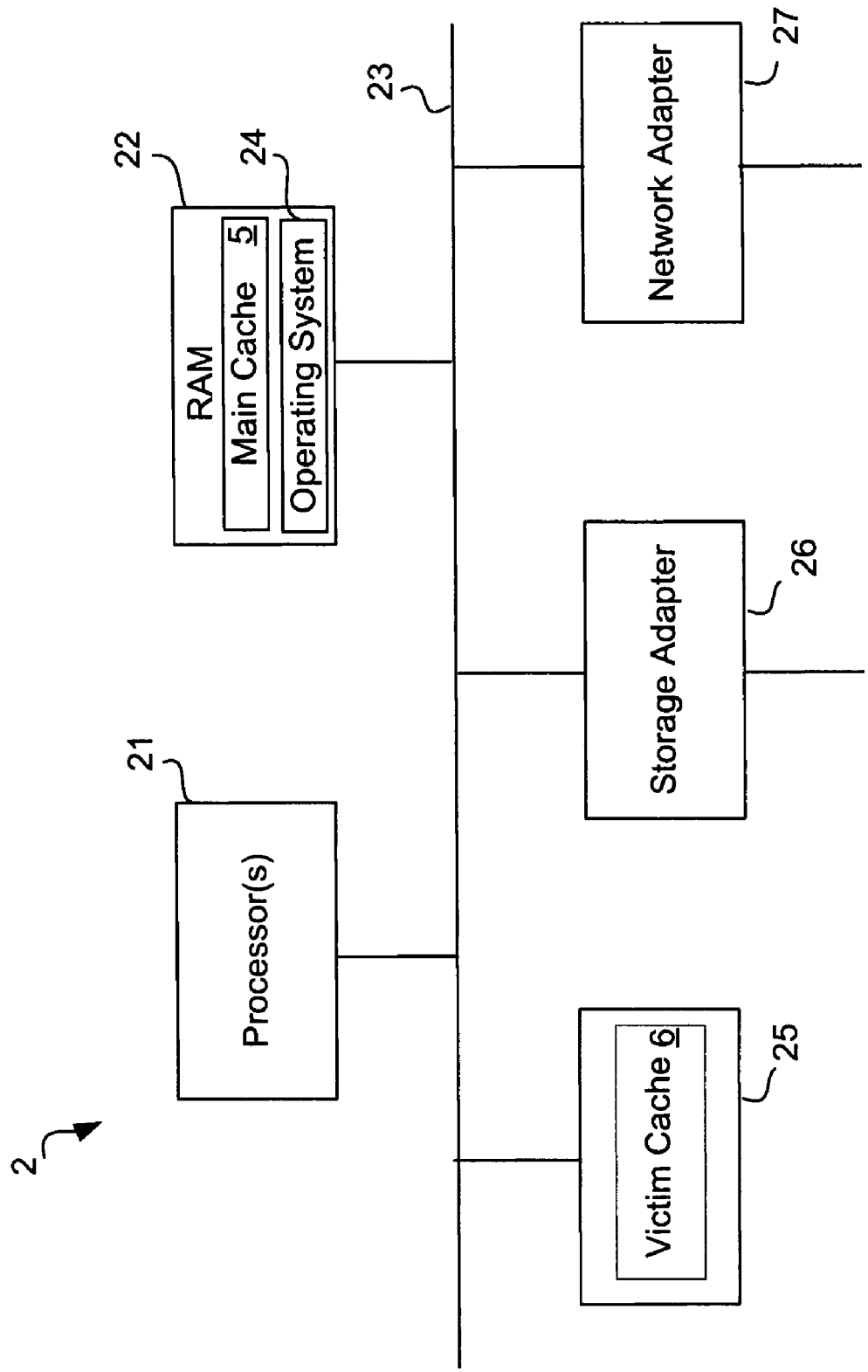
FIG. 2 shows an example of the hardware architecture of the storage server, including a victim cache.

FIG. 2 is a block diagram showing an example of the architecture of the storage server 2 at a high level. Certain standard and well-known components which are not germane to the present invention are not shown. The storage server 2 includes one or more processors 21 and RAM 22 coupled to a bus system 23. The storage server 2 may also include one or more forms of read-only memory (ROM), not shown. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 21 form the CPU of the storage server 2 and, thus, control its overall operation. In certain embodiments, the processors 21 accomplish this by executing software stored in RAM 22 and/or other memory in the storage server 2. Each processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

RAM 22 is the main memory (including the main cache 5) of the storage server 2 and also may store some or all of the storage server's operating system 24 during normal operation. Operations associated with the technique being introduced here can be implemented by the operating system 24.

Also connected to the processors 21 through the bus system 23 are a peripheral device 25 which implements the victim cache 6, a storage adapter 26 and a network adapter 27. Peripheral device 25 can be implemented as a dedicated expansion card, and the memory which embodies the victim cache 6 may be implemented in the form of SSDs, flash memory, or other types of storage devices. Note, however, that it is not essential that the victim cache 6 be internal to the storage server 2.

The storage adapter 26 allows the storage server 2 to access the mass storage subsystem 4 and may be, for example, a Fibre Channel adapter or a SCSI adapter. The network adapter 27 provides the storage server 2 with the ability to communicate with remote devices, such as the clients 1, over a network and may be, for example, an Ethernet adapter, a Fibre Channel adapter, or the like.

Figure 3A:
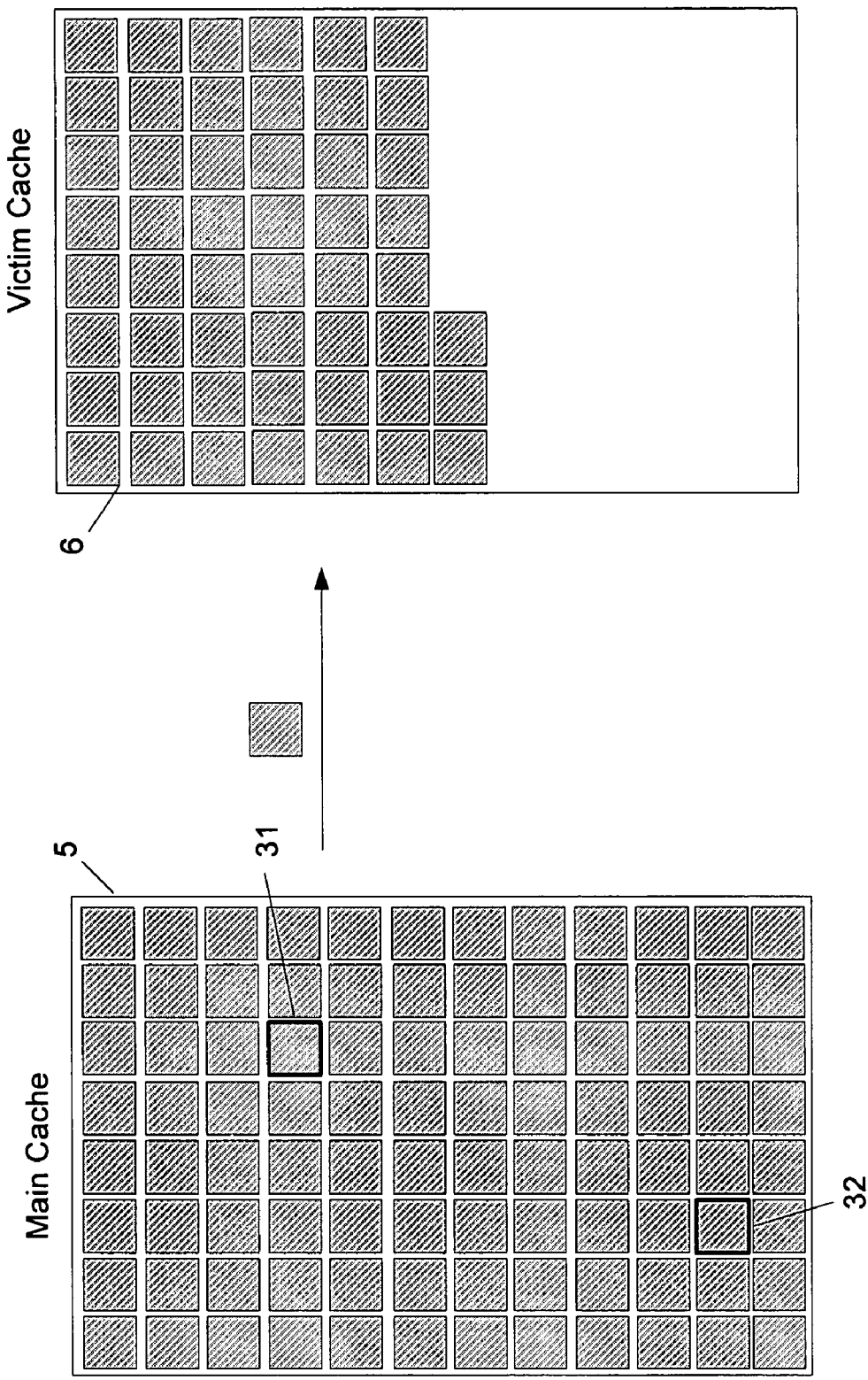
FIG. 3A illustrates eviction of a buffer from the main cache to the victim cache.

The process of identifying an old buffer in the main cache and then evicting it is known as "buffer scavenging". The buffer eviction process is illustrated in FIG. 3A. When there is a need to write a buffer into the main cache 5 but the main cache 5 is full, a buffer 31 in the main cache 5 is identified for eviction (alternatively, this scavenging process may be performed as a background process, not in connection with any particular write operation). The identified buffer 31 then may be stored in the victim cache 6, depending upon the outcome of the caching policies mentioned above. This process is expected to return another buffer 32 for the storage server 2 to immediately overwrite (reuse) in the main cache 5, which may or may not be the same buffer 31 that was evicted from the main cache 5.

Note that any conventional algorithm or set of algorithms can be used to decide which buffers should be evicted from the main cache 5 (e.g., least recently used (LRU), first-in/first-out (FIFO), etc.). In one embodiment, the main cache 5 is managed as a waterfall set of multiple LRU queues, each having different priorities, where each buffer slowly ages down the set of queues while the buffer is not accessed, and moves up the set of queues based on accesses to that buffer (aging is based on the operation rate). A buffer stored in the main cache 5 has an initial queue, based on the buffer type (user data, indirect block, metadata, directory, etc.) and a maximum queue level (also based on the buffer type).

Figure 3B:
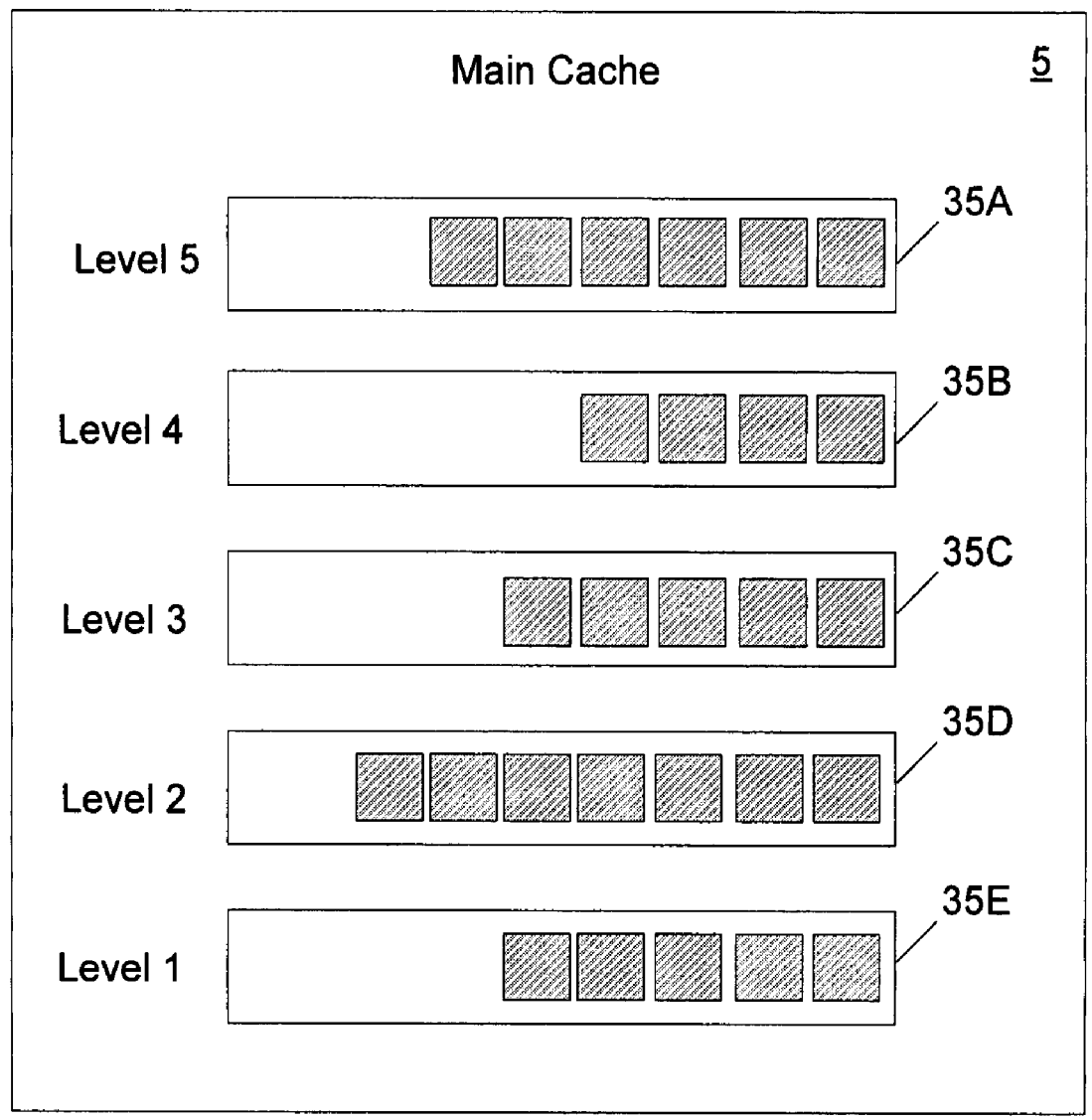
FIG. 3B illustrates the main cache including of multiple priority queues.

This approach is illustrated schematically in FIG. 3B. FIG. 3B shows the main cache 5 including (or managed as) a collection of queues 35A through 35E, each of which has a different priority level. For example, queue 35A has the highest priority ("level 5") while queue 35E has the lowest priority ("level 1"). Note that the particular number of queues and priority levels described here is chosen only to facilitate explanation; essentially any number of queues and priority levels can be used.

During normal operation, for example, a typical user data block may start at queue 35C (priority level 3) and have a maximum priority level of 5. Blocks that are accessed frequently eventually go up to queue 35A (priority level 5). Blocks that are accessed infrequently age down in the collection of queues, eventually to queue 35E (priority level 1), where they are more likely to be scavenged. The significance of this queue prioritization scheme to the victim cache's operation will be apparent from the description below.

Figure 4:
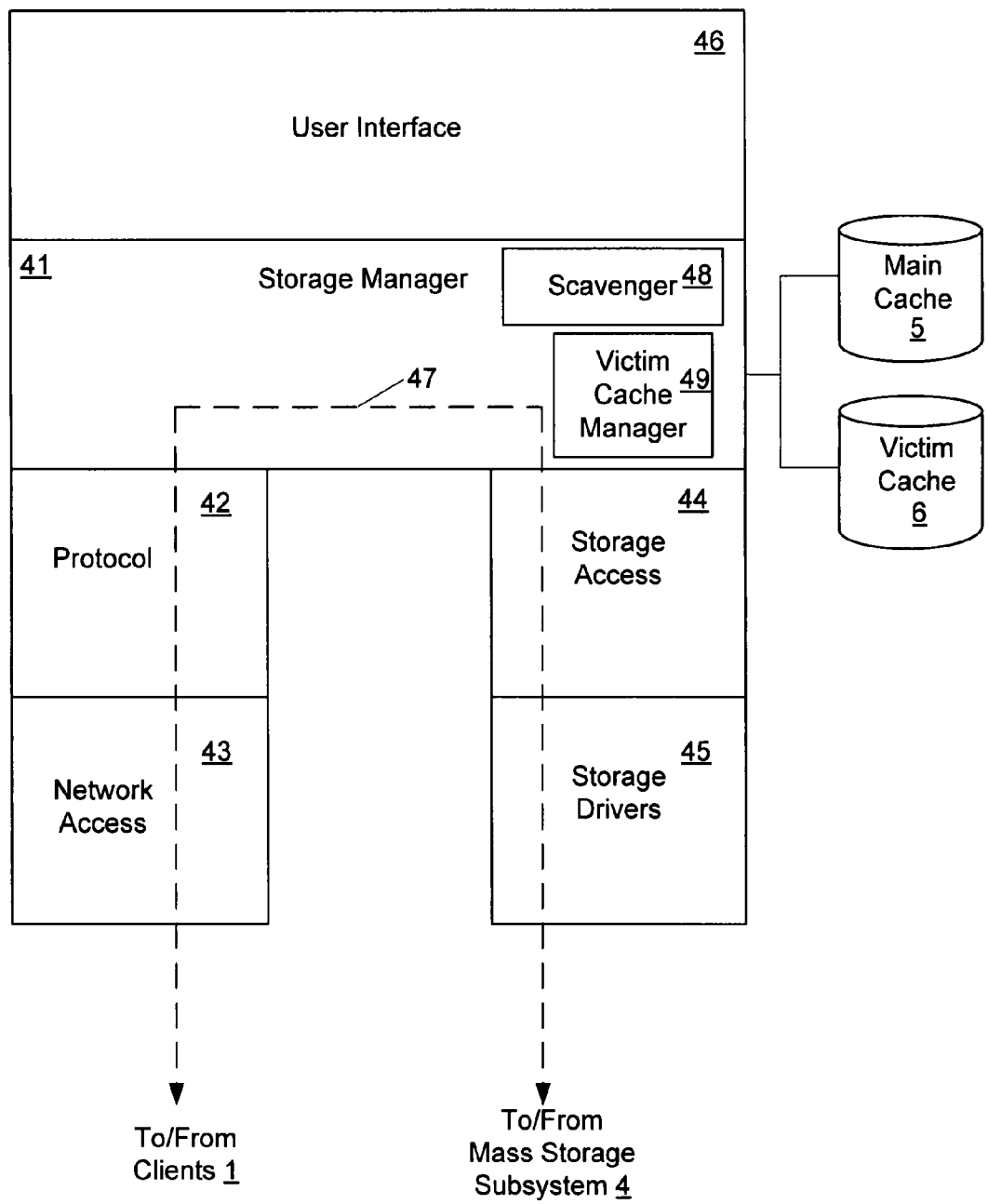
FIG. 4 illustrates the architecture of the operating system of the storage server.

The storage server 2 includes an operating system to control its operation, including implementation of the technique illustrated in FIG. 3. An example of the operating system is shown in FIG. 4. The operating system 24 and its constituent elements are preferably implemented in the form of software and/or firmware. However, in some embodiments, some or all of the elements of the operating system may be implemented in the form of special-purpose hardware such as one or more application specific integrated circuits (ASICs), programmable logic devices (PLDs) or the like, or a combination of such hardware and software/firmware.

As shown, the operating system 24 includes several modules, or "layers". These layers include a storage manager 41. The storage manager 41 is, in certain embodiments, software that manages one or more file systems or other structured sets of data managed by the storage server 2, e.g., a file system manager. In particular, the storage manager 41 imposes a hierarchy (e.g., a directory/file structure) on the data stored in the storage subsystem 4 and manages client-initiated read and write operations at a high level (while delegating certain functions to lower-level layers). The storage manager 41 also manages access to the main cache 5, the victim cache 6 and (at a high level) the mass storage subsystem 4 (access to the mass storage subsystem 4 is managed at a lower-level by the storage access layer 44, as discussed below).

To allow the storage server 2 to communicate over the network 3 (e.g., with clients 1), the operating system 24 also includes a network access layer 43, and a protocol layer 42 operatively coupled between the storage manager 41 and the network access layer 43. The protocol layer 42 implements a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 43 includes one or more drivers which implement one or more lower-level protocols to communicate over the network, such as Ethernet or Fibre Channel.

To enable the storage server 2 to communicate with the mass storage subsystem 4, the operating system 24 includes a storage driver layer 45, and a storage access layer 44 operatively coupled between the storage manager 41 and the storage driver layer 45. The storage access layer 44 implements a higher-level disk storage protocol, such as RAID-4, RAID-5 or RAID-DP, while the storage driver layer 45 implements a lower-level storage device access protocol, such as Fibre Channel Protocol (FCP) or SCSI. The storage access layer 4 is alternatively called the "RAID layer" in this description.

Also shown in FIG. 4 is the path 47 of data flow, through the operating system 24, associated with a client-initiated read or write request.

The operating system 24 also includes a user interlace 46 to generate a command line interface (CLI) and/or graphical user interface (GUI), to allow administrative control and configuration of the storage server 2, from a local or remote terminal.

As shown in FIG. 4, the storage manager 41 includes a scavenger module 48 and a victim cache manager 49. The scavenger module 48 implements the buffer scavenging process, as described above. The victim cache manager 49 "intelligently" (by applying policies) controls the storage of data in the victim cache 6, as described above and as further described below. To facilitate these operations, the victim cache manager 49 also maintains a fast lookup table (not shown) that indicates whether any given buffer is in the victim cache 6, and if so, where it is in the victim cache 6. This lookup table can reside in main memory and can be implemented as a hash or tag table.

As noted above, caching policies are used to create a prefilter so that the most useful blocks are stored in the victim cache 6 upon eviction from the main cache 5. Some of these policies can be quite simple, e.g., "Buffers marked invalid or lacking a physical address shall not be cached." Other policies may require detailed knowledge of the type of buffer, or buffer state, to determine what the appropriate outcome should be (i.e., cache or do not cache).

In one embodiment, the victim cache manager 49 uses two types of caching policies, both controllable by the storage server administrator: global external caching policy and volume-specific Control of Service (CoS) caching policy. A global external caching policy is set to apply to all volumes managed by the storage server, or at least all volumes within some specified storage domain. An example of such a policy might be, "Only cache high-priority metadata in the victim cache." A volume-specific CoS caching policy is set to apply only to specified volumes, for example, "Blocks associated with volume db_log should not be cached," and can be used to customize caching for application-specific workloads.

In one embodiment, the following controls are defined in a global caching policy. The first control is called NORMAL_DATA_BLOCKS, which relates to data blocks classified as normal data blocks and which has a value of "On" or "Off." The second control is called LOPRI_BLOCKS, which relates to data blocks classified as low priority and which has a value of "On" or "Off." In this embodiment, the global caching policy applies these controls as indicated in Table 1 (if no CoS cache policy applies), to determine whether to store a given data block in the victim cache.

TABLE 1

Example of Global Caching Policy

| NORMAL_DATA_BLOCKS | LOPRI_BLOCKS | CACHE SYSTEM META-DATA? | CACHE NORMAL DATA? | CACHE LOW PRIORITY DATA? |
|---|---|---|---|---|
| On | Off | Yes | Yes | No |
| Off | On | Yes | No | No |
| On | On | Yes | Yes | Yes |
| Off | Off | Yes | No | No |

The criteria that determine what is a "normal" data block as opposed to a "low priority" data block are arbitrary, in that they depend on the particular configuration and needs of the storage system; those criteria are not germane to the technique being introduced here.

Thus, an application which has a very large working set such that no normal data could be effectively cached would have both controls set "Off", so benefiting from the caching of system metadata. On the other hand, an application which has a fairly small, mostly-read working set so that it fit entirely (or almost entirely) in the victim cache 6 might want to set both controls "On".

In general, a volume CoS policy is intended to control the behavior of the main cache 6 but, in accordance with the technique introduced here, also affects operation of the victim cache 6, as described below. The possible settings for a volume CoS policy are, in one embodiment, "Keep", "Reuse" and "Default". Both "Reuse" and "Keep" alter the behavior of the main cache 6, so that the priority queue which blocks are placed on is different from the default. For example, Reuse blocks (i.e., blocks in a volume for which the CoS policy is set to "Reuse") start on a lower priority queue than Keep blocks (i.e., blocks in a volume for which the CoS policy is set to "Keep"). As a more specific example, a Keep block might have a default queue priority level of 4 in the main cache 5, and a maximum queue priority level of 5, while a Reuse block might have a default queue priority level of 2 and a maximum queue priority level of 4. Additionally, Reuse blocks are marked for early eviction from the main cache 5 as soon as their data has been sent to a user. "Default" means there is no special override for the volume, so the global policy is followed.

As noted above, while a volume CoS policy affects the behavior of the main cache 5, according to the technique introduced here it can also affect whether evicted blocks get stored in the victim cache 6. According to one embodiment, if a CoS policy applies to the particular volume which contains the evicted data block, the result of the global caching policy is modified as shown in Table 2, with the outcome indicated in the far right column.

TABLE 2

Example of Combined Effect of Global and Volume CoS Caching Policies

| GLOBAL POLICY | VOLUME COS POLICY | STORE IN VICTIM CACHE? |
|---|---|---|
| Cache | Keep | Yes |
| Cache | Reuse | No |
| Cache | Default | Yes |
| Discard | Keep | Yes |

TABLE 2-continued

Example of Combined Effect of Global and Volume CoS Caching Policies

| GLOBAL POLICY | VOLUME COS POLICY | STORE IN VICTIM CACHE? |
|---|---|---|
| Discard | Reuse | No |
| Discard | Default | No |

Thus, a configuration that only wants to save system metadata in the victim cache 6, except for a specific important volume, may choose to set the global policy control NORMAL_DATA_BLOCKS="Off" and the CoS policy for the volume to "Keep". On the other hand, a configuration that wants to cache all normal user data, except for a specific volume that should not be cached, may set the global policy control NORMAL_DATA_BLOCKS="On" and the CoS policy for the volume to "Reuse".

Figure 5:
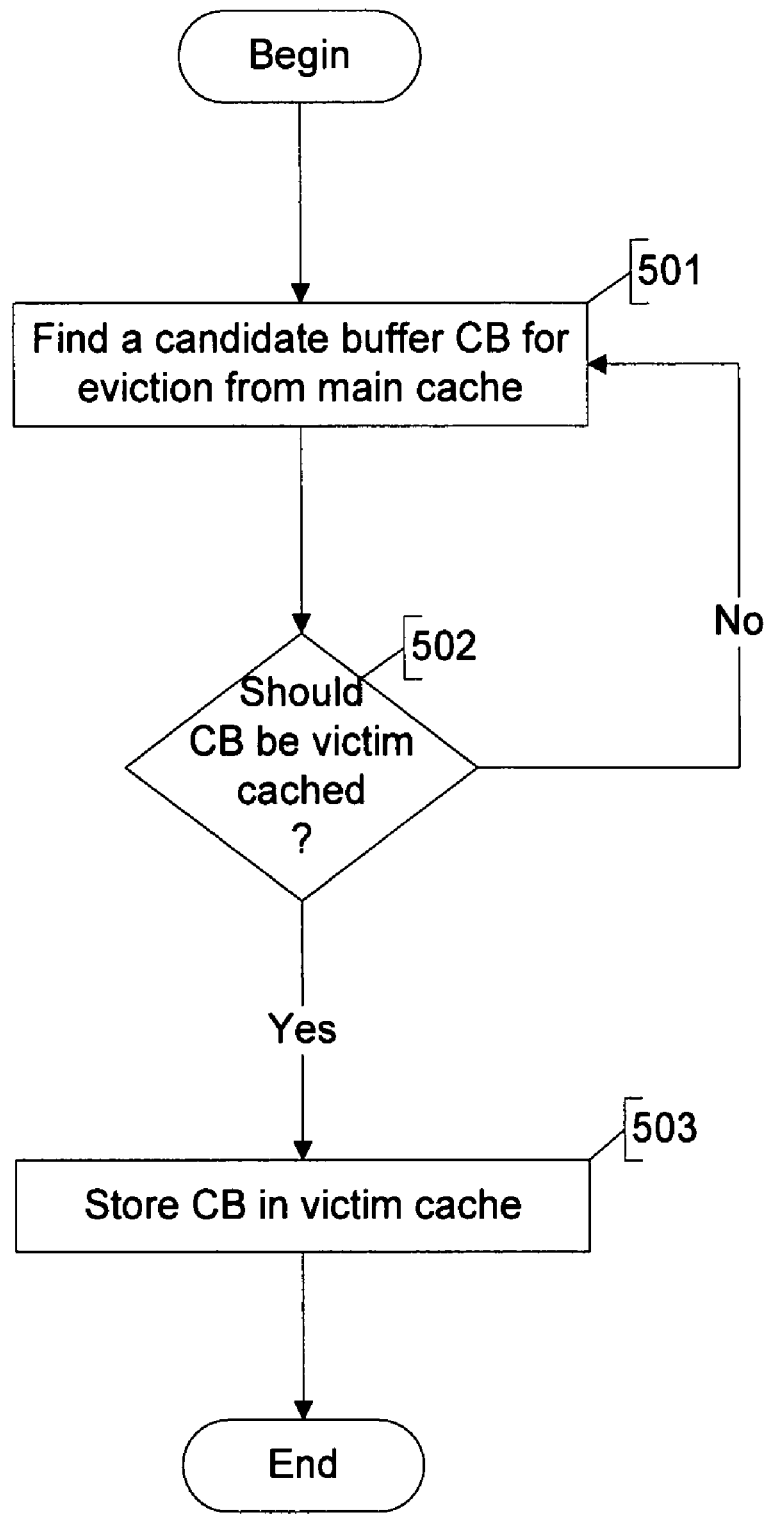
FIG. 5 is a flow diagram illustrating an example of the buffer scavenging process.

FIG. 5 illustrates an example of the overall buffer scavenging process. As indicated above, the process may be triggered when there is a specific need (e.g., when a buffer needs to be written to the main cache but the main cache is full) or it may be performed as a background process. Initially, at 501 the scavenger module 48 finds a candidate buffer CB for eviction from the main cache 5. Next, at 502 the victim cache manager 49 determines whether the candidate buffer CB should be cached in the victim cache 6. If the outcome of this determination is negative, the process loops back to 501 where another candidate buffer for eviction is found. If the outcome of determination 502 is affirmative, then the victim cache manager 49 stores the candidate buffer CB in the victim cache 6.

Figure 6:
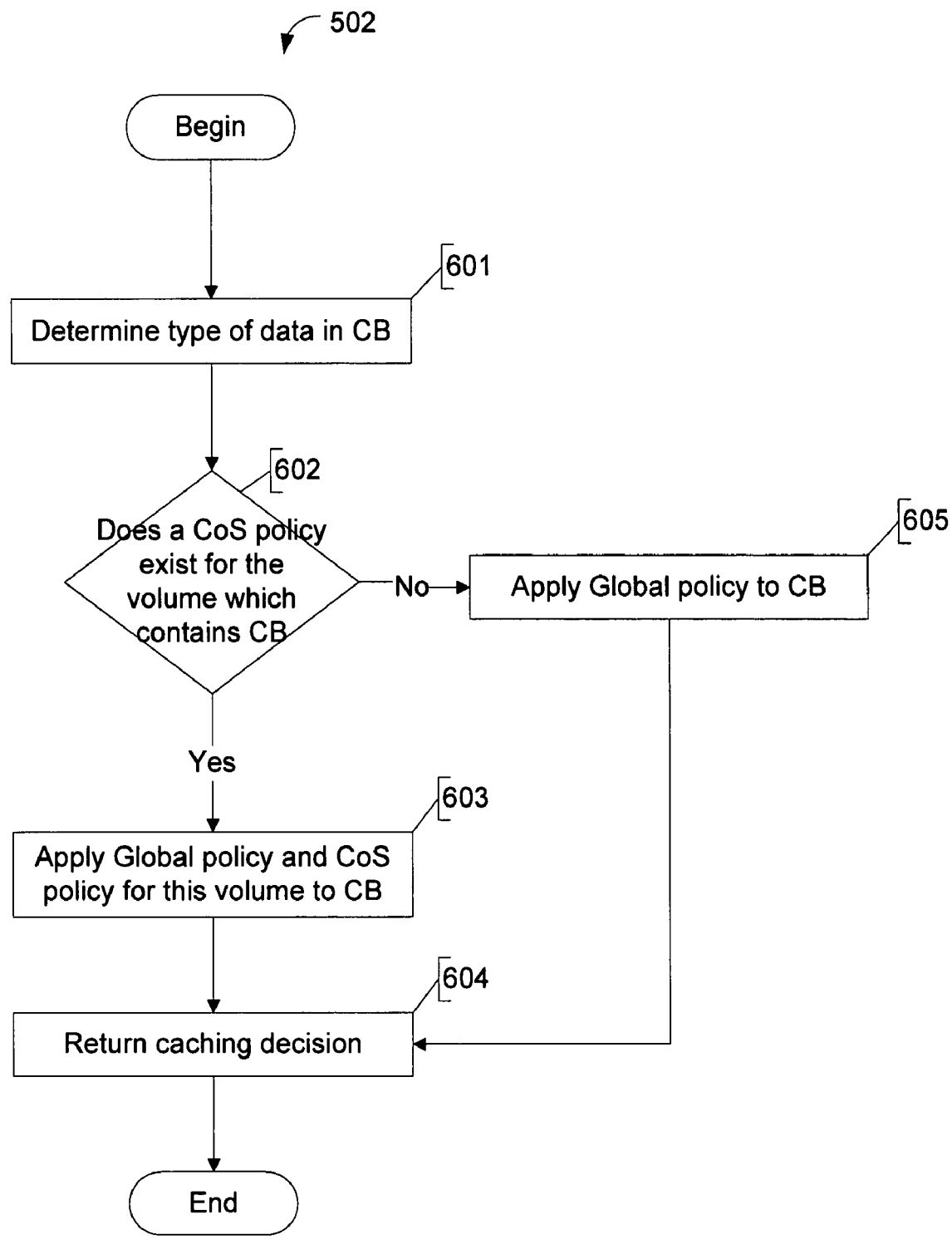
FIG. 6 is a flow diagram illustrating an example of the process to determine whether a buffer should be cached in the victim cache.

FIG. 6 shows in greater detail the determination 502 of whether a buffer should be cached in the victim cache 6, according to one embodiment. This process is implemented by the victim cache manager 49. Initially, at 601 the process determines the type of data in the candidate buffer CB, for example, whether it is system metadata, normal user data or low priority data. Every buffer (data block) managed by the storage server 2 has associated metadata which includes, among other things, an indication of the type of data in that buffer. The metadata may be stored in or appended to each buffer, or it may be stored elsewhere within the storage system. The determination 601 can be made from the metadata associated with the candidate buffer CB.

Next, at 602 the process determines whether a CoS policy exists for the volume which contains the candidate buffer CB. If no CoS exists for that volume, then the process proceeds to 605, in which the global caching policy is applied to the candidate buffer CB to generate a decision on whether to cache the candidate buffer CB in the victim cache 6. The process then returns that caching decision to the calling process at 604. If a CoS policy does exist for that volume (602), then the process instead proceeds to 603, in which the process applies the global policy and the CoS policy in combination to the candidate buffer CB to generate the decision on whether to cache the candidate buffer CB in the victim cache 6. In the embodiment described above, the CoS policy essentially overrides the global policy, unless the CoS policy is set to "Default". The process then returns the caching decision to the calling process at 604.

Note that various modifications or variations upon the above described technique are possible. For example, the technique is not limited to the specific caching policies described above or any particular number of caching policies. Any number of policies can be defined, and any number of controls for those policies may be used. As another example, a storage server can have multiple victim caches, and I/O operations to the multiple victim caches can be performed in parallel. In this way, multiple victim caches can be effectively operated as a single larger victim cache.

Thus, a method and apparatus for intelligently determining whether to cache data blocks in a victim cache of a storage server have been described. It can be seen that the solution introduced above allows customizable victim cache policies that enable a victim cache to be configured for the best possible performance, based on individual system requirements. Integration with CoS cache policies provide an integrated model that users can control to best effect. The net result is faster performance than an system without intelligent victim cache policies.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a network storage server, the method comprising:

performing data access operations, by the network storage server, on a non-volatile mass storage facility, a main cache and a victim cache of the network storage server, wherein the storage server is configured to maintain a plurality of volumes;

designating a data block for eviction from the main cache based on an eviction policy; and in response to the data block being designated for eviction from the main cache, determining whether to store the data block in the victim cache based on a global victim caching policy and a type of data contained within the data block, wherein the global victim caching policy applies to all of the plurality of volumes.

2. A method as recited in claim 1, wherein the global victim caching policy specifies how data is to be treated for a plurality of data types with respect to a plurality of controls.

3. A method as recited in claim 2, wherein the plurality of data types comprise system metadata, normal data and low priority data.

4. A method as recited in claim 3, wherein the plurality of controls comprise a first control for normal data blocks and a second control for low priority data blocks.

5. A method as recited in claim 1, wherein said determining whether to store the data block in the victim cache is further based on a volume-specific victim caching policy, and wherein the volume-specific victim caching policy applies to a subset of the plurality of volumes.

6. A method as recited in claim 5, wherein the volume-specific victim caching policy is a volume-specific control of service (CoS) policy.

7. A method as recited in claim 6, wherein the main cache comprises a plurality of data queues having different prioritizations, and wherein the volume-specific victim caching policy determines placement of data within said plurality of data queues.

8. A method of operating a network storage server, the method comprising:

maintaining a plurality of volumes of data in a non-volatile mass storage facility of the network storage server;

performing data access operations, by the network storage server, on a main cache and a victim cache of the network storage server;

identifying data blocks for eviction from the main cache based on an eviction policy;

determining a type of data contained within each of the data blocks identified for eviction from the main cache; and determining whether to store the data blocks in the victim cache based on a global victim caching policy and the types of data contained within the data blocks and further based on a volume-specific victim caching policy, wherein the global victim caching policy applies to all of the plurality of volumes and the volume-specific victim caching policy is a volume-specific control of service (CoS) policy and applies to a subset of the plurality of volumes.

9. A method as recited in claim 8, wherein the global victim caching policy specifies how data is to be treated for a plurality of data types with respect to a plurality of controls.

10. A method as recited in claim 9, wherein the plurality of data types comprise system metadata, normal data and low priority data.

11. A method as recited in claim 10, wherein the plurality of controls comprise a first control for normal data blocks and a second control for low priority data blocks.

12. A method as recited in claim 8, wherein the main cache comprises a plurality of data queues having different prioritizations, and wherein the volume-specific victim caching policy determines placement of data within said plurality of data queues.

13. A storage server comprising:
a network interface through which to receive data access requests from a plurality of clients via a network;
a storage interface through which to access a non-volatile mass storage facility;
a main cache;
a victim cache; and
a storage manager to manage data stored on a plurality of volumes in the non-volatile mass storage facility, the main cache and the victim cache, the storage manager including:
a scavenger module to scavenge data blocks in the main cache, including to select a data block for eviction from the main cache based on an eviction policy, and
a victim cache manager to respond to the data block being selected for eviction from the main cache by determining whether to store the data block in the victim cache based on a global victim caching policy and a type of data contained within the data block, wherein the global victim caching policy applies to all of the plurality of volumes.

14. A storage server as recited in claim 13, wherein the global victim caching policy specifies how data is to be treated for a plurality of data types with respect to a plurality of controls.

15. A storage server as recited in claim 14, wherein the plurality of data types comprise system metadata, normal data and low priority data.

16. A storage server as recited in claim 15, wherein the plurality of controls comprise a first control for normal data blocks and a second control for low priority data blocks.

17. A storage server as recited in claim 13, wherein said determining whether to store the data block in the victim cache is further based on a volume specific victim caching policy, and wherein the volume-specific victim caching policy applies to a subset of the plurality of volumes.

18. A storage server as recited in claim 17, wherein the volume-specific victim caching policy is a volume-specific control of service (CoS) policy.

19. A storage server as recited in claim 18, wherein the main cache comprises a plurality of data queues having different prioritizations, and wherein the volume-specific victim caching policy determines placement of data within said plurality of data queues.

20. A storage server comprising:
a main cache;
a victim cache; and
a memory storing instructions which, when executed by the processor, cause the processing system to execute a process that includes:
identifying data blocks for eviction from the main cache based on an eviction policy;
determining a type of data contained within each of the data blocks identified for eviction from the main cache; and
determining whether to store the data blocks in the victim cache based on a global victim caching policy and the types of data contained within the data blocks and further based on a volume-specific victim caching policy, wherein the global victim caching policy applies to all of a plurality of volumes and the volume-specific victim caching policy applies to a subset of the plurality of volumes.

21. A storage server as recited in claim 20, wherein the volume-specific victim caching policy is a control of service (CoS) policy.

22. A storage server as recited in claim 20, wherein the global victim caching policy specifies how data is to be treated for a plurality of data types with respect to a plurality of controls.

23. A storage server as recited in claim 22, wherein the plurality of data types comprise system metadata, normal data and low priority data.

24. A storage server as recited in claim 23, wherein the plurality of controls comprise a first control for normal data blocks and a second control for low priority data blocks.

25. A storage server as recited in claim 20, wherein the main cache comprises a plurality of data queues having different prioritizations, and wherein the volume-specific victim caching policy determines placement of data within said plurality of data queues.

* * * * *